April 24, 1934. H. E. ALTGELT 1,956,262
TRACTOR IMPLEMENT
Filed May 21, 1928 3 Sheets-Sheet 1
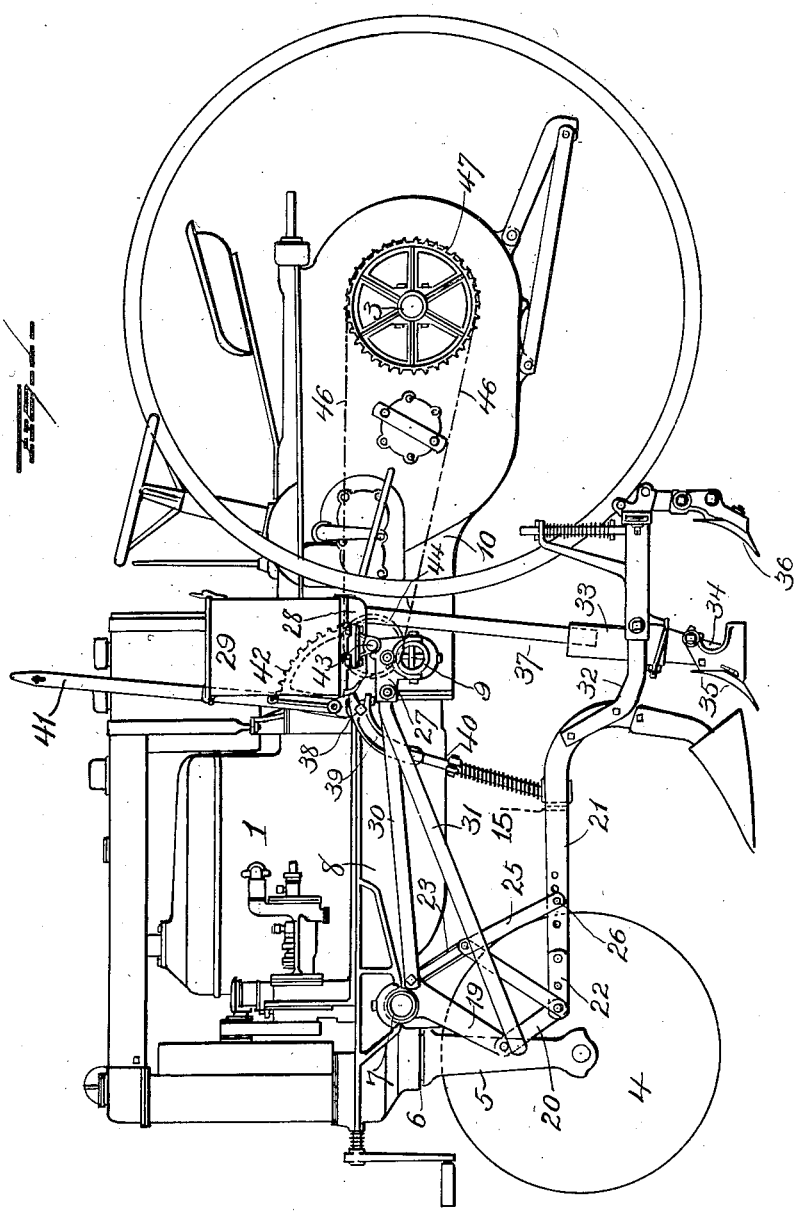

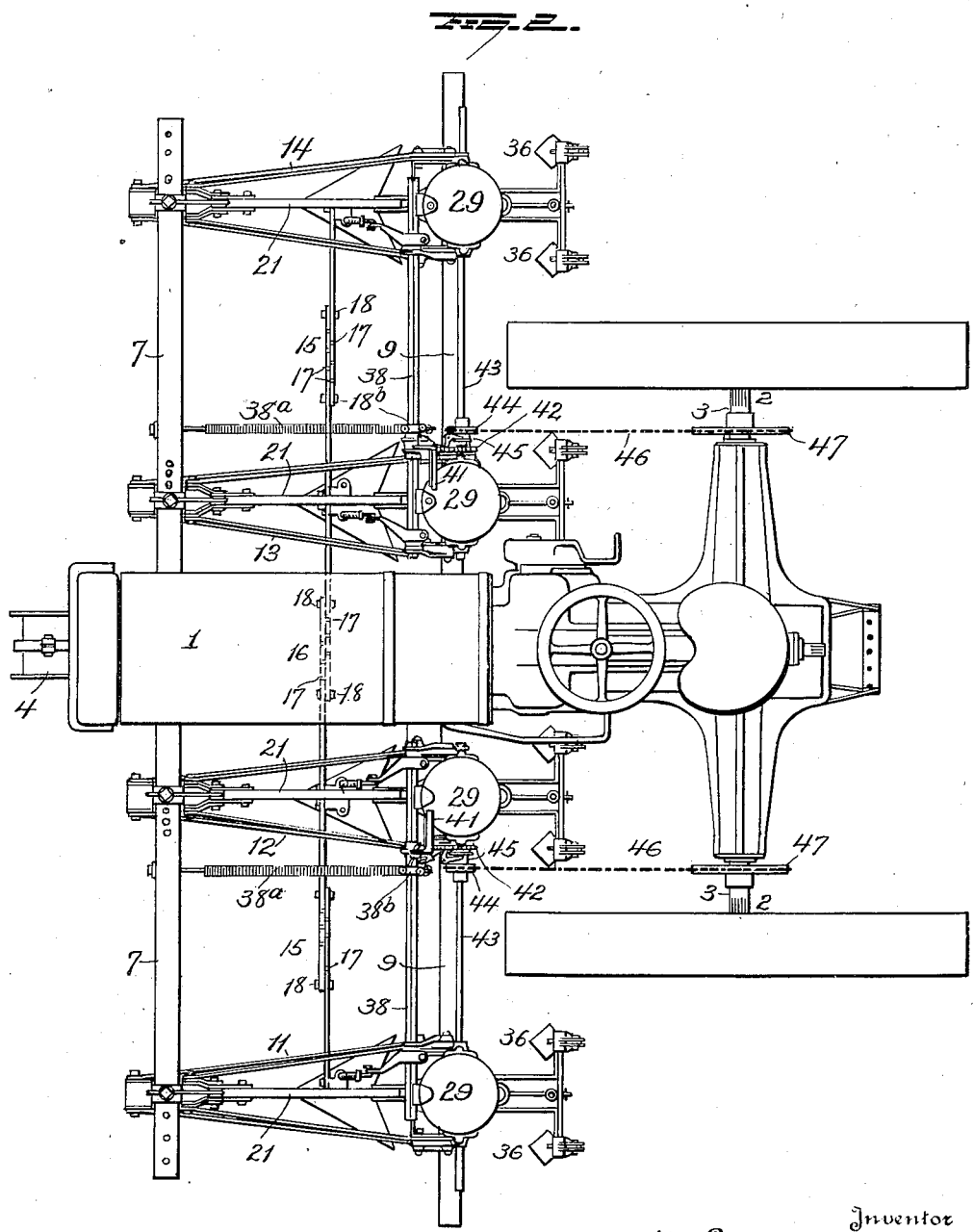

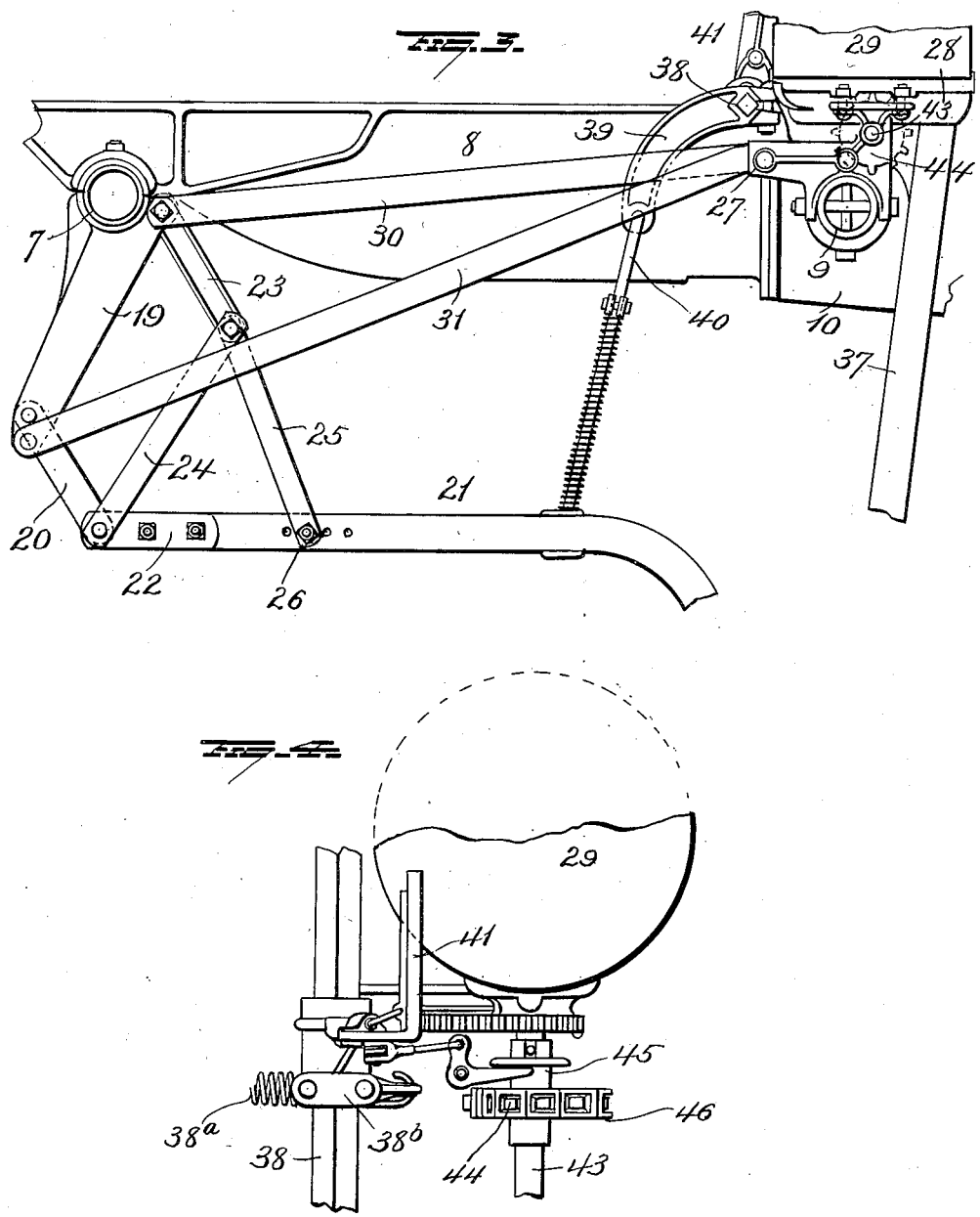

Patented Apr. 24, 1934

UNITED STATES PATENT OFFICE 1,956,262

TRACTOR IMPLEMENT

Herman E. Altgelt, South Bend, Ind., assignor, by mesne assignments, to Oliver Farm Equipment Company, a corporation of Delaware Application May 21, 1928, Serial No. 279,575

17 Claims. (Cl. 111—59)

This invention relates to improvements in tractor implements and more particularly to improved planter attachments for tractors,—objects of the invention being to provide a structure whereby planter attachments may be intimately associated with and carried by the tractor at respective sides thereof and the feed mechanism of the planter units be effectually operated from the axle members of the tractor without interfering with the lifting and controlling mechanism for the planter units, and to provide simple and efficient lifting and controlling mechanism associated with the tractor and with the planter units.

With these and other objects in view, the invention consists in certain novel features of construction and combinations of parts as hereinafter set forth and pointed out in the claims.

In the accompanying drawings;

Figure 1 is a side elevational view showing a tractor planter embodying my invention;

Figure 2 is a plan view of the same and

Figures 3 and 4 are enlarged views showing details of construction.

A tractor is illustrated at 1 and in the present instance, said tractor is of the three-wheel type in which traction wheels are adjustably attached, as at 2, to rear axle members 3 so that said wheels may be adjusted laterally with respect to the tractor, for purposes which will hereafter be made apparent. In the tractor construction shown in the drawings, the single steering wheel 4 of the tractor is located at the forward end of the tractor body and the bracket 5 in which the front wheel 4 is mounted may have a swivel mounting as at 6 under the forward end portion of the tractor structure.

A forward transverse beam 7 is secured to and under the crank case or oil pan 8 of the tractor and projects laterally in both directions from the latter so that it constitutes anchoring means for connecting the forward portions of planting mechanism with the tractor at respective sides. A rear transverse beam 9 secured to the transmission case 10 of the tractor and projects in both directions laterally from the same so as to constitute anchoring means for connecting the rear portions of planting mechanism at respective sides of the tractor. The specific manner of connecting the transverse anchoring beams with the tractor do not constitute part of my present invention, the same being disclosed in my copending application filed March 19, 1928, and designated by Serial No. 262,930.

In the embodiment of the invention shown in the drawings, four planting mechanisms or units 11, 12, 13 and 14 are shown, two at each side of the tractor, and each of said mechanisms is anchored to the forward and rear transverse beams carried by the tractor. The tractor planter is therefore adapted to plant four rows simultaneously and hence the transverse beams are of suitable lengths to accommodate four planter units, the outermost units being located laterally beyond the lines of travel of the rear tractor wheels. A greater number of units may be employed and the anchor beams made longer to accommodate them or a single planter unit may be employed at each side of the tractor.

The several planter units are flexibly connected and suitably spaced by pivoted bars 15—15 between the units of each pair and adjustably connected together, and bars 16—16 are adjustably connected together beneath the tractor and pivoted to the innermost units 12—13, thus flexibly connecting the pairs of units. Respective end portions of each planter unit are adjustably connected to the anchor beams 7 and 9 respectively, so that the units may be adjusted laterally to change the spacing of the planter units and hence the spacing of the rows to be planted. One way in which the lateral spacing or adjustment of the units may be effected is to provide the anchor beam with a plurality of holes such as is shown at 17' to receive, in any of them, a securing bolt for securing the forward end of the units to the beam. The planting units are also adjustably spaced with respect to each other by transverse horizontal bars 15—15 and 16. The ends of these bars are pivotally connected to intermediate portions of each of the beams 21 as is clearly disclosed in Fig. 2 of the drawings. The function of these bars is to maintain a uniform spacing of the rows planted. With the improvements above described, I am enabled to adjust the tractor planter for rows spaced, for example, 36, 38, 40 and 42 inches apart, and by adjusting the traction wheels laterally, running of said wheels over planted seed will be avoided.

It will be observed that each planter unit is of such length that portions of the earth working parts will be rearwardly of a line passing transversely through the traction wheels of the tractor.

Each planter unit is the same in construction and a detail description of one will suffice for all, but it may be here stated that when planter units are arranged in sets, one set at each side of the tractor, the sets of units may be raised and lowered independently of each other, notwithstanding the fact that the set of planter units at one side of the tractor is flexibly connected with the set of planter units at the other side of the tractor through the medium of adjustable spacing means as previously explained.

Each planter unit includes an arm or hanger 19 rigidly but adjustably secured to the forward transverse anchor beam 7 and extends downwardly and somewhat forwardly therefrom. A link 20 is pivotally connected at one end with the lower portion of the hanger 19 and at its other end, said link 20 is loosely connected with the forward end portion of a beam 21, through the medium of plates 22 secured to said beam and projecting forwardly therefrom. Links 23 are pivotally connected at their upper ends with the upper portion of the hanger 19 and extend downwardly and somewhat rearwardly therefrom and the lower ends of the links 23 are connected with the lower portion of the link 20, through the medium of links 24. It will be observed that the members 19, 20, 23 and 24 constitute a parallelogram and that when raising or lowering power is applied to the rear portion of the beam 21, said beam and the devices carried thereby will move vertically from end to end of said beam.

The links 24 are held in proper position by means of braces 25 connected at their upper ends with said links 24 and at their lower ends said braces 25 are adjustably connected with the beam 21, as indicated at 26. The object of the adjustable connection between the braces 25 and the beam 21, is to make it possible to raise or lower the front end of the beam with relation to its rear end.

Each planting unit also includes a bracket 27 rigidly secured to the rear transverse anchoring beam 9 secured to the transmission housing of the tractor and this bracket may constitute, in effect, part of a seed can support 28, so that this support may be said to be secured upon the rear transverse anchor beam 9, and upon said support, a seed can 29 is mounted. Braces 30 and 31 are bolted at their rear ends to seed can support (or rather to the bracket 27 thereof) and at their forward end, to the upper and lower portions respectively, of the hanger 19 and serve to brace the seed can support as well as the hanger 19. These braces will serve to prevent the transverse anchor beam 7 from twisting on account of the twisting strain which the hanger 19 would tend otherwise to exert on said anchor beam.

In the drawings the rear or standard portion of the beam of each planting unit has secured thereto a furrow opener of the type embodying sweeps. A supporting frame 32 is carried by the beam 21 and projects rearwardly therefrom. This supporting frame carries a boot 33 having a spout 34 and the latter carries a shovel 35. The sweep openers in some cases may be replaced by lister bases which make deeper ditches and leave ridges between the planted rows. In such case, it is desirable to run the traction wheels on the ridges and the adjustability of the traction wheels are therefore of importance, because it would be disastrous if they would press additional earth upon the seed.

It is sometimes desirable to employ listers without planting devices, in which case the traction wheels would be so adjusted that they would run on the ridges between the ditches made by the lister or middle breaker bases.

Each planting unit includes a feeding mechanism (not shown) in each support 28 and a tube 37 to conduct the seed to the boot 33.

A shaft 38 has bearings in the seed can supports 28 of the planting units of each set and are provided with arms 39, the latter being connected through the medium of rods 40 with the rear portions of the beams 21 of the planting units of the respective sets of units. A hand lever 41 is secured to each shaft 38 inwardly of lines passing through the treads of the adjacent traction wheel and provided with a suitable detent for cooperation with a fixed segment 42.

It is apparent that by manipulation of one or the other hand lever 41, one or the other set of planting units may be independently raised or lowered. If desired counterbalancing springs 38$^a$ may be employed and attached to the transverse anchor beam 7 and arms 38$^b$ on the respective shafts 38.

A feed shaft 43 is common to the planting units of each set and each shaft 43 has mounted thereon, a sprocket wheel 44 which is connected with its shaft 43 through the medium of a clutch mechanism 45 under the control of the adjacent hand lever 41. Each sprocket wheel 44 receives a sprocket chain 46 which transmits motion thereto from a larger sprocket wheel 47 on the axle section 3 of one of the traction wheels.

It will be understood that when one of the hand levers is operated to lower one of the sets of planting units, the clutch mechanism controlled by that lever will be operated to connect the adjacent sprocket wheel 44 with its feed shaft so that power will be imparted to the seed feeding mechanism for the planting units of the set, and that when the hand lever is reversely operated and the set of planting units raised, the seed feeding mechanism will be operatively disconnected from its propelling mechanism.

Having fully described my invention what I claim as new and desire to secure by Letters Patent, is:—

1. In a tractor implement, the combination with a tractor, planting units at the respective sides thereof and anchored thereto, adjustable spacing connections passing transversely under the tractor for varying the spacing relation between said units, a separate shaft for the units on each side of the tractor, and separate driving connections for driving said shafts by the power of said tractor.

2. In a tractor implement, the combination with a tractor, planting units at respective sides thereof and anchored thereto, and adjustable means passing transversely under the tractor for adjustably connecting said planting units.

3. The combination with a tractor having rear traction wheels and axle members for said wheels, of planting units arranged in sets with certain of said units being located laterally and forwardly of the traction wheels of the tractor and certain other of said units being located outwardly beyond each of the traction wheels of the tractor, separate feed operating shafts for each set, and gearing between said shafts inwardly of said traction wheels and separately connected to the axle members thereof.

4. In a tractor implement, the combination of a tractor, a forward anchor member secured to the tractor and projecting laterally therefrom, a rear anchor member secured to the tractor and projecting laterally therefrom, a hanger supported by the forward member and depending therefrom, earth working means including a beam connected with said hanger and braces between respective end portions of said hanger and said rear anchor member.

5. In a tractor implement, the combination with a tractor having traction wheels, of a plurality of planter units, means for connecting said units to the tractor, connections between the planter units, means for effecting lateral adjustment of the connections of the planter units with respect to each other whereby the spacing of said units may be adjusted, and means whereby the traction wheels may be adjusted laterally.

6. In a tractor implement, the combination with a tractor having traction wheels, of a plurality of planter units located at respective sides of the tractor, means for connecting said units to the tractor, means for effecting lateral adjustment of the connections of the planter units with the tractor whereby the spacing of said units may be adjusted, a supplemental adjustable connection between the planter units independent of the tractor, and means whereby the traction wheels may be adjusted laterally.

7. In a tractor implement, the combination with a tractor, anchor means projecting laterally therefrom, and the beam of an earth working element, of a hanger rigidly secured to and depending from said anchor means, upper and lower links connected with respective end portions of said hanger, link connections between said upper and lower links, a loose connection between the lower link and the said beam, and means to raise and lower said beam.

8. In a tractor implement, the combination with a tractor, anchor means projecting laterally therefrom, and the beam of an earth working element, of a hanger rigidly secured to and depending from said anchor means, upper and lower links connected with respective end portions of said hanger, link connections between said upper and lower links, a loose connection between the lower link and said beam, braces between said beam and said upper link, and means to raise and lower said beam.

9. In a tractor implement, the combination with a tractor, anchor means projecting laterally therefrom, and the beam of an earth working element, of a hanger rigidly secured to and depending from said anchor means, upper and lower parallel links connected with respective end portions of said hanger, link connections between said upper and lower links, a loose connection between the lower link and said beam, braces between said beam and said upper link, the connections between said braces and said beam being adjustable, and means to raise and lower said beam.

10. In a tractor implement, the combination with a tractor having rear traction wheels and front steering means and an axle member for each wheel, of planter units carried by said tractor and located laterally on both sides of each traction wheel, said tractor constituting the sole support for said planter units, said planter units including a feed operating shaft, gearing connecting said shaft with one of said axle sections and means for adjustably connecting said planter units together.

11. In a tractor implement, the combination with a tractor having rear traction wheels and front steering means and an axle member for each traction wheel, of a set of planting mechanisms laterally of the tractor and anchored thereto, said planting mechanisms extending forwardly of the plane of axis of the rear traction wheels, one planting mechanism of the set located outwardly of the line of travel of one of the traction wheels and another planting mechanism of the set located inwardly of the line of travel of the same traction wheel, a feed operating shaft common to the planting mechanisms of the set, and gearing between said shaft and one of the axle members.

12. In a tractor implement, the combination with a tractor having rear traction wheels, of a set of planting units laterally of the tractor and anchored thereto, one of the planting units of the set being located outwardly of the line of travel of one of said traction wheels and the other of said planting units being located inwardly of the line of travel of the said traction wheel, both planting mechanisms extending forwardly of the plane of the axis of the rear traction wheel, and a shaft common to the units of each set extending across the path of said traction wheels and geared to the axle of said traction wheel.

13. In a tractor implement, the combination with a tractor having rear traction and front steering means, of a set of planting units laterally of the tractor and anchored thereto, one of the planting units being located outwardly of the line of travel of one of said traction wheels and another of said planting units being located inwardly of the line of travel of the same traction wheel and laterally of the longitudinal center of the tractor, both units of the set extending forwardly of the plane of the axis of the rear traction wheels, lifting mechanism common to the planting mechanism of the units, and a shaft common to the units of the set and driven by the power of the said tractor.

14. In a tractor implement, the combination of a tractor having rear traction wheels and a front ground wheel, of a multiple row planter attachment comprising sets of planter units at respective sides of the tractor, said planter units being located rearwardly of the axis of the front wheel, means for adjustably anchoring said sets of planter units to the tractor, and means for adjustably and flexibly connecting all of said units together.

15. A tractor implement, comprising a tractor having rear laterally adjustable traction wheels, and front dirigible supporting means, ditch forming earth working devices at the respective sides of said tractor, anchoring means secured to the tractor and with which said earth working devices are connected, and connections between said earth working devices spaced rearwardly from said anchoring means and independent of said tractor for effecting a lateral adjustment and proper spacing of the earth working devices with respect to each other.

16. In a tractor implement, the combination with a tractor including rear traction wheels, of sets of planting units laterally of the tractor and anchored thereto, and a separately driven feed shaft for each set, said feed shafts being transversely disposed forwardly of the traction wheels and rearwardly of the front end of the tractor, the units of each set being individually adjustable laterally of the tractor and longitudinally of the seed shaft.

17. In a tractor implement, the combination with a tractor including traction wheels, of planting units laterally of the tractor and anchored thereto, driven seed planting mechanism associated with said units, said planting units including earth engaging means disposed forwardly of the axis of the traction wheels, means for driving said seed planting mechanism by the motive power of said tractor, and adjustable pivoted connections extending under said tractor between all of said units for varying the spacing between the rows.

HERMAN E. ALTGELT.